(12) United States Patent
Castetter

(10) Patent No.: US 12,197,199 B2
(45) Date of Patent: Jan. 14, 2025

(54) SYSTEM AND METHOD FOR DYNAMIC MONITORING AND CONTROL OF A PROCESS GAS COMPRESSOR

(71) Applicant: BL TECHNOLOGIES, INC., Minnetonka, MN (US)

(72) Inventor: Jeffrey Castetter, Lebanon, IN (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 839 days.

(21) Appl. No.: 17/417,990

(22) PCT Filed: Dec. 24, 2019

(86) PCT No.: PCT/US2019/068470
§ 371 (c)(1),
(2) Date: Jun. 24, 2021

(87) PCT Pub. No.: WO2020/139878
PCT Pub. Date: Jul. 2, 2020

(65) Prior Publication Data
US 2022/0075359 A1   Mar. 10, 2022

Related U.S. Application Data

(60) Provisional application No. 62/785,530, filed on Dec. 27, 2018.

(51) Int. Cl.
*G05B 23/02* (2006.01)
*G06Q 10/0639* (2023.01)
(Continued)

(52) U.S. Cl.
CPC ....... *G05B 23/024* (2013.01); *G05B 23/0283* (2013.01); *G06Q 10/06393* (2013.01); *F04B 51/00* (2013.01)

(58) Field of Classification Search
CPC .............. G05B 23/024; G05B 23/0283; G06Q 10/06393; F04B 51/00
(Continued)

(56) References Cited

U.S. PATENT DOCUMENTS

2009/0149981 A1   6/2009  Evans et al.
2012/0150335 A1*  6/2012  Prabhu ............... G05B 23/0294
                                                                   700/110
(Continued)

FOREIGN PATENT DOCUMENTS

CN        101842756 A      9/2010
CN        103294015 A      9/2013
(Continued)

OTHER PUBLICATIONS

Office Action and Search Report issued for Chinese Application No. 201980084199.1, dated Nov. 22, 2023.
(Continued)

*Primary Examiner* — Michael J Brown
(74) *Attorney, Agent, or Firm* — Meunier Carlin & Curfman LLC

(57) ABSTRACT

Disclosed herein are systems, methods and computer program products for monitoring and maintaining operation, performance and reliability of a process gas compressor and auxiliary equipment used in a production environment by evaluating key performance indications (KPIs) versus design across three areas—thermodynamic, rotor dynamics and system performance ratios.

21 Claims, 24 Drawing Sheets

(51) Int. Cl.
*F04B 51/00* (2006.01)
*G06Q 10/06* (2023.01)

(58) Field of Classification Search
USPC .......................................................... 700/110
See application file for complete search history.

(56) References Cited

U.S. PATENT DOCUMENTS

| | | | |
|---|---|---|---|
| 2014/0336984 A1* | 11/2014 | Starr ................ | G05B 23/0297 |
| | | | 702/183 |
| 2015/0057973 A1* | 2/2015 | Saravanapriyan | ........................ |
| | | | G05B 23/0218 |
| | | | 702/182 |
| 2016/0342154 A1 | 11/2016 | Panov | |
| 2017/0102693 A1 | 4/2017 | Kidd et al. | |
| 2018/0306054 A1 | 10/2018 | Adibhatla | |
| 2019/0093505 A1* | 3/2019 | Escriche ................ | B64F 5/30 |

FOREIGN PATENT DOCUMENTS

| | | |
|---|---|---|
| CN | 105980945 A | 9/2016 |
| CN | 106020154 A | 10/2016 |
| CN | 106933207 A | 7/2017 |
| CN | 108732962 A | 11/2018 |

OTHER PUBLICATIONS

Office Action issued in corresponding Taiwanese Patent Application No. 108140448, dated May 31, 2023 (untranslated).
Office Action issued in corresponding Taiwanese Patent Application No. 108140448, dated May 31, 2023 (English translation).
International Search Report and Written Opinion dated Mar. 31, 2020, from International Application No. PCT/US2019/068470, 13 pages.
Examination Report dated Feb. 28, 2021, issued in related GC Application No. 2019-38548, 4 pages.
Chinese National Intellectual Property Administration. Office Action issued in Chinese Application No. 201980084199.1 on Apr. 18, 2024. 5 pages. English Translation.
Canadian Intellectual Property Office. Office Action. Issued in Canadian Application No. 3122111 on Apr. 9, 2024. 7 pages.

* cited by examiner

XYZ Ethylene Unit
Compressor Service Report

Report Date: _____

Compressor Data

| Stage | VOL FLOW (ACFM) | TEMPERATURE (deg F) | | Pressure (psig) | | Efficiency | Efficiency | Efficiency |
|---|---|---|---|---|---|---|---|---|
| | | Suction | Discharge | Suction | Discharge | | | |
| 1st | | | #NAME? | | | | | |
| 2nd | | | #NAME? | | | | | |
| 3rd | | | #NAME? | | | | | |
| 4th | | | #NAME? | | | | | |
| 5th | | | #NAME? | | | | | |

Application Injection Rates

| Stage | Antifoulant | | Wash Water, GPM | | Wash Oil, GPM | |
|---|---|---|---|---|---|---|
| | Current | Target | Current | Target | Current | Target |
| 1st | | | | | | |
| 2nd | | | | | | |
| 3rd | | | | | | |
| 4th | | | | | | |
| 5th | | | | | | |

Comments/Observations/Recommendations

FIG. 8A

FLOW RATE KPI TRENDS

DISCHARGE TEMPERATURE KPI TRENDS

SYSTEM AND METHOD FOR DYNAMIC MONITORING AND CONTROL OF A PROCESS GAS COMPRESSOR

BACKGROUND

Maximizing asset performance and reliability during lengthy production runs are key challenges to the global ethylene industry. An intensified challenge when production runs of five to even ten years are being targeted in several cases. In addition, water and/or process fouling can have a dramatic impact on overall plant performance, along with significant associated economic penalties in energy and productivity losses.

Among the assets of the ethylene unit, there is no asset more critical than the process gas compressor (PGC) and its associated equipment—the PGC train. The ethylene PGC train is a dynamic system comprised of multiple pieces of equipment and measurement devices/systems (compressors, turbine, interstage coolers, surface condenser, liquid removal drums, lube oil and seal systems, anti-surge protection system, governor, couplings, thermocouples, pressure transmitters, proximity probes, torque converters, ect.). As with any integrated system, failure of a single component during the production run can force the entire ethylene unit to take a costly unplanned shutdown.

There is enormous value at stake from risk-related sustainability issues. Selecting the right tools and business suppliers/partners to mitigate risk of operational disruption due to fouling will be very important decisions.

Ethylene producers have many choices when selecting tools for PGC train fouling control and monitoring technology. Various approaches to minimize equipment fouling have been employed. They include applying specialty coatings to compressor and turbine rotors, injecting water to reduce compressor discharge temperature, injecting wash oil to help solubilize polymer deposits, and the addition of specialty antifouling technologies to prevent polymerization, among others. Additionally, multiple measurement systems and methods have been used to monitor and evaluate machine efficiency. This has led to mixed results and difficulties in the correct assessment of compressor performance.

Ethylene is a critical building block for the petrochemical industry and is among the most produced organic compounds. It is usually produced in steam-cracking units from a range of petroleum-based feedstocks, such as ethane-propane and/or naphtha, and is used in the manufacture of several major derivatives.

The process of ethylene production, as generally shown in FIG. 1 is a steam-cracking process for ethylene production from an ethane-propane mixture. The process can be divided into three main parts: cracking and quenching; compression and drying; and separation.

In the cracking and quenching part, initially, an ethane-propane mixture is fed to furnaces in which, under high-severity conditions, it is cracked, forming ethylene, propylene and other byproducts. The furnace outlet stream is subsequently fed to a water-based quench, to prevent further reactions and formation of undesirable byproducts.

The cracked gas from the quench tower is then directed to the compression and separation part of the process. The condensed dilution steam, heavy hydrocarbons, tar and coke are removed.

In the compression and drying part of the process, the compression of the cracked gas is performed across multiple stages. In the instance shown in FIG. 1, there are five stages of gas compression, though other ethylene design processes may have fewer stages. In FIG. 1, after the third stage of compression, carbon dioxide and sulfur are removed from the cracked gas by a liquid caustic and water wash/contact in the caustic scrubber. The compressed cracked gas is then cooled and subsequently dried by molecular sieves to remove any remaining moisture.

In the separation part of the process, the dried cracked gas is fed to a cold box for the removal of hydrogen and light hydrocarbons, while minimizing ethylene losses. At this point, condensates from the chilling train are fed to a series of separation columns. In the first column (demethanizer), methane is obtained from the top and further used in the cold box, while the bottom stream is fed to a second column (deethanizer). The top of the deethanizer, composed primarily of ethylene and ethane, is fed to an acetylene converter and then fractionated in the C2-splitter. In this column, lights are removed from the overheads and recycled to the compression system, while polymer-grade (PG) ethylene is drawn from the column as a side stream. Ethane, from C2-splitter bottoms, is recycled to the cracking furnaces.

The deethanizer bottom stream is fed to a depropanizer, which distills C3 components in the overheads. This overhead stream is catalytically hydrotreated for methyl acetylene and propadiene removal, and then fed to the C3-splitter. In this column, lights are removed from the overheads and recycled to the compressors, while polymer-grade (PG) propylene is drawn from the column as a side stream. Propane from C3-splitter bottoms is recycled to the cracking furnaces. A C4+ stream is obtained from the depropanizer bottoms.

As noted herein, the compression stage is critical to the production of ethylene. However, the compressor used in this part of the process, often referred to as a process gas compressor, undergoes tremendous stress, exposure and degradation during the intervals between turnarounds. It must be monitored, maintained and treated to perform safely and reliably during the process of ethylene production. Regarding the monitoring of compressor performance, a common problem is the volume of data being sent to the monitoring system and collected in the data historian. It is difficult for ethylene plant personnel to convert hundreds of megabytes of data per minute into health insight trends and maintenance relevant information.

While the above generally focuses on ethylene production, it is to be appreciated that process gas compressors are also used in oil and gas production and processing; oil refining; industrial gas production; and the like, and similar challenges are experienced in those fields of endeavor as are experienced with ethylene production.

Therefore, systems, methods and computer monitoring and diagnostic program products are desired that overcome challenges in the art, some of which are described above.

SUMMARY

Disclosed and described herein are systems, methods and computer program products for monitoring and maintaining operation, performance and reliability of a process gas compressor and its associated auxiliary equipment (steam turbine, surface condenser, interstage coolers and condensation drums, and the like) used in a production environment by evaluating key performance indications (KPIs) versus design across three areas—thermodynamic, rotor dynamics and system performance ratios. The production environment may include ethylene production; oil and gas production and processing; oil refining; industrial gas production; and the like.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
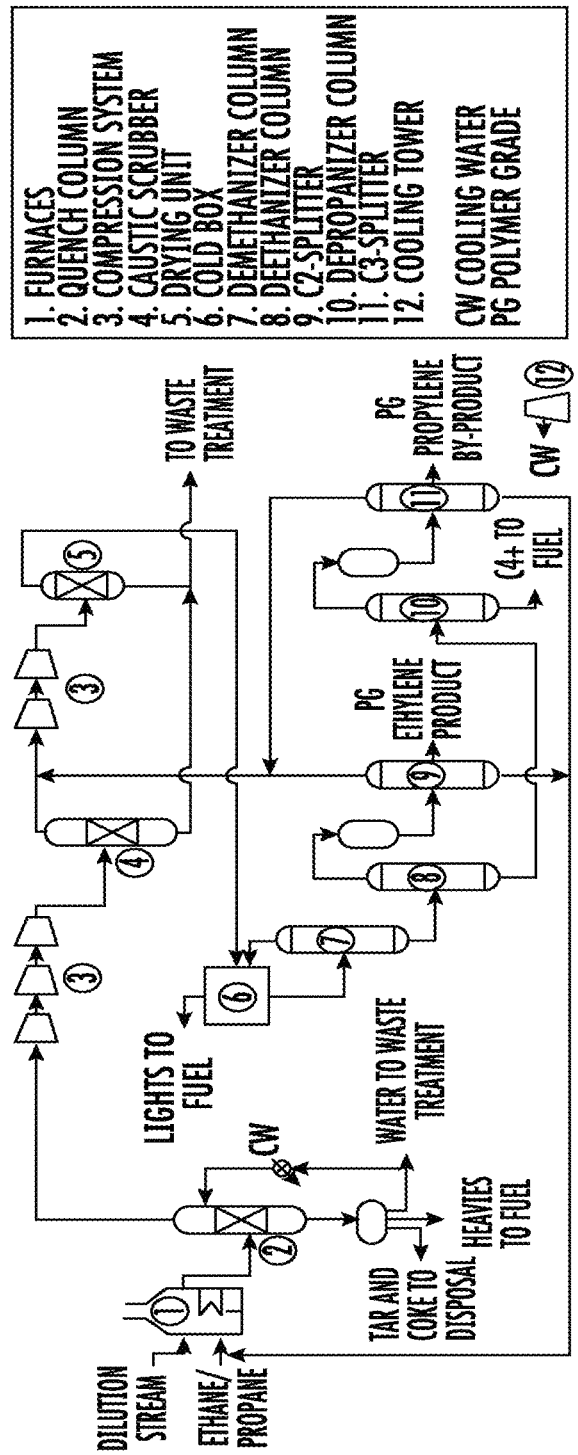
FIG. 1 is a process diagram showing an exemplary ethylene-production process via the cracking of an ethane-propane mixture.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 2:
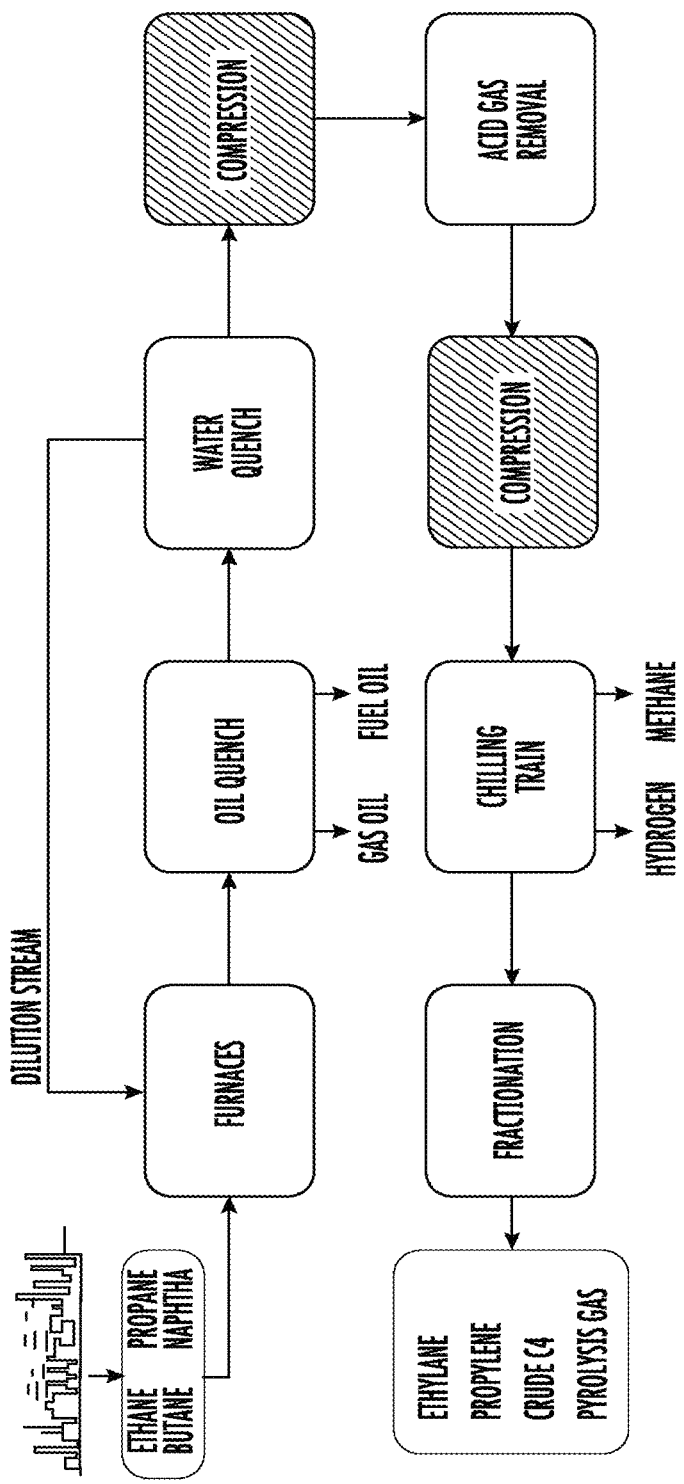
FIG. 2 is a simplified block diagram of an ethylene production unit.

FIG. 2 is a simplified block diagram of a process for producing ethylene. In the process shown in FIG. 2, there are typically 3-5 individual stages of compression in the ethylene unit (depends on unit design). The simplified block diagram (FIG. 2) illustrates a few stages of compression before the acid gas/caustic tower and a few stages of compression following.

Figure 3:
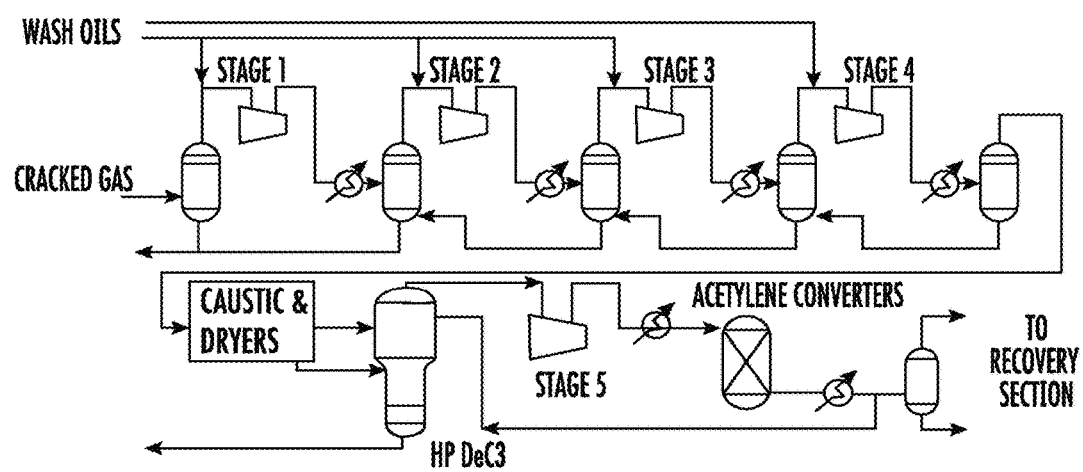
FIG. 3 is a process flow diagram of an exemplary process gas compressor.

FIG. 3 is a process flow diagram of an exemplary process gas compressor. This illustration shows a common five-stage compression design layout for an ethylene unit. It shows four stages of compression before the acid gas/caustic towers and a fifth stage of compression following. The process gas flowing through the compressor is being compressed thought each stage—the initial inlet pressure at stage 1 would be approximately 6-10 psi and at the exit of the final stage of compression the gas would be approximately 550-600 psi.

Figure 4:
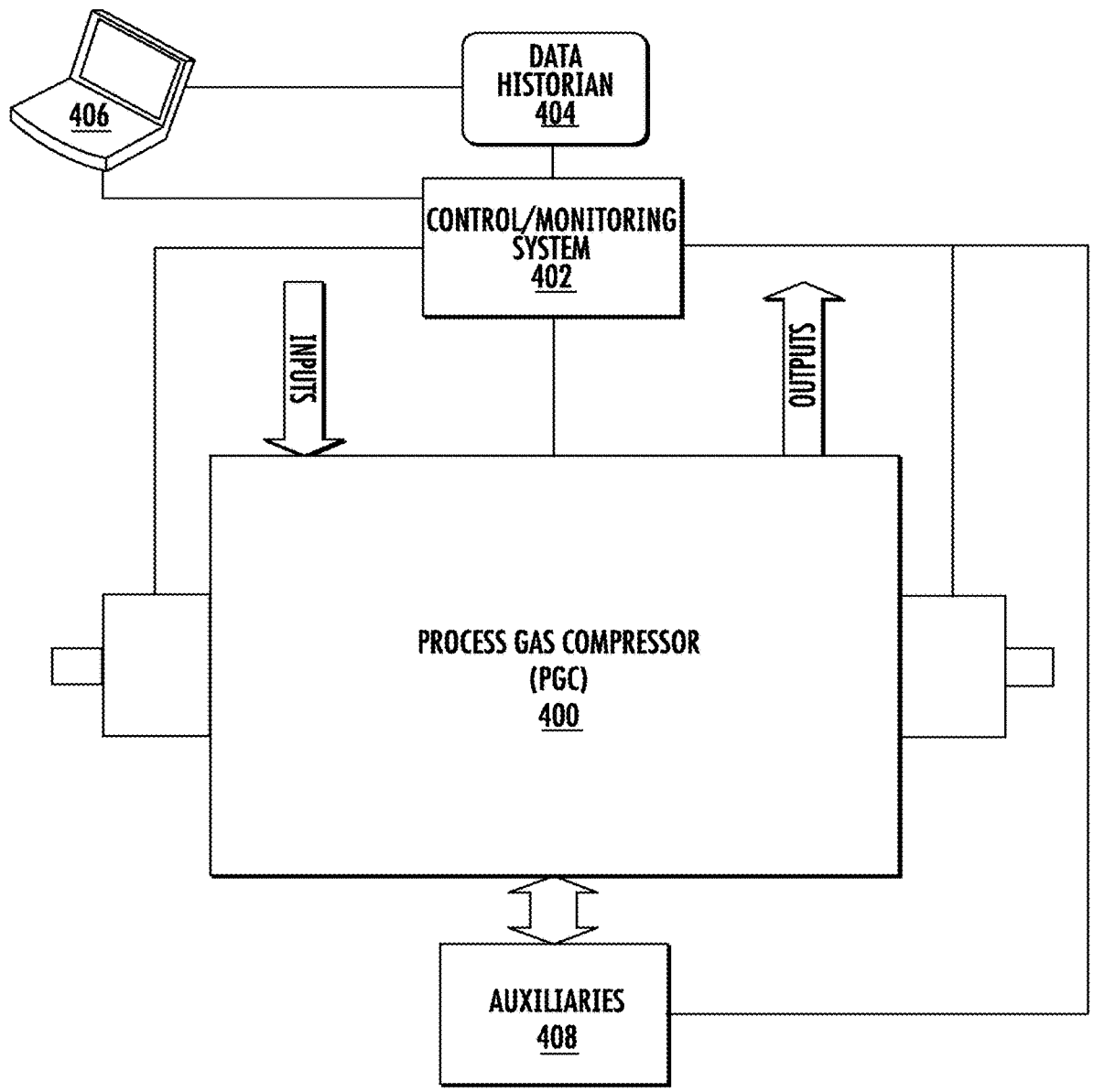
FIG. 4 is a simplified diagram of a system for monitoring and maintaining operation, performance and reliability of a process gas compressor used in a production environment.

FIG. 4 is a simplified diagram of a system for monitoring and maintaining operation, performance and reliability of a process gas compressor 400 used in a production environment. Generally, the process gas compressor 400 will have from three to five separate compression stages. In the system of FIG. 4, data related to the process gas compressor 400 is measured and collected by a control and/or monitoring system 402. The control/monitoring system 402 includes at least a processor and a memory in communication with the processor (as described in greater detail herein). There are hundreds of measurements that are being taken from the entire process gas compressor system. These measurements include but are not limited to: pressures and temperatures on the inlet and outlet of each stage; mass or volumetric gas flow rates; inboard and outboard radial vibrations, bearing temperatures and axial movement measurements from each compressor and turbine rotor; interstage cooler pressures, temperatures and delta pressure; liquid level control measurements for each interstage knockout; steam flow rates; cooling water flows and temperatures; turbine and rotor speeds; gas composition and molecular weight (which has to be calculated or simulated—it depends on the plant's available tools of measurement).

At least a portion of the data measured and collected by the control/monitoring system is stored in a data historian 404. The data historian comprises at least a memory that is accessible by the control/monitoring system 402. At least a portion of the measured and collected data stored in the data historian 404 is retrieved by a device 406 having at least a processor. In some instances, the processor of the device 404 may be the same processor as used by the control/monitoring system 402. The device 406 uses its processor to perform calculations for key performance indicators (KPIs) and diagnostic outputs for the process gas compressor and its associated auxiliary equipment (steam turbine, surface condenser and the interstage coolers and condensation drums) 400 using the retrieved measured and collected data. The KPIs and diagnostic outputs are calculated for thermodynamic performance, rotor dynamics and system performance ratios 408 associated with the process gas compressor 400. Polytropic efficiency of the process gas compressor 400 is one KPI. Additional KPIs include but are not limited to compression ratio, discharge temperature, temperature rise, volumetric flow, head, radial vibration, axial movement, bearing temperatures, rotor speed, delta pressure, steam flow, vacuum pressure, approach temperature, additive dosages and the like.

Generally, the control/monitoring system 402 also monitors and maintains operation, performance and reliability of the associated auxiliary equipment 408 and is used to measure and collect data related to the auxiliary equipment 408 associated with the process gas compressor 400. KPIs and diagnostic outputs associated with the auxiliary equipment 408 may include one or more of pressure differential across piping, status and performance of interstage coolers, status and performance of exchangers and knock-out drums, key performance ratios, approach temperatures, horsepower trends, and the like.

The device 406 then compares the calculated KPIs and diagnostic outputs for the process gas compressor to design and setpoint limits. This may be performed using one or both of retrieved measured and collected data (retrieved from the data historian 404) and real-time data as it is measured by the control/monitoring system 402. Generally, comparing the calculated KPIs and diagnostic outputs for the process gas compressor to design and setpoint limits includes comparing the calculated KPIs and diagnostic outputs for the associated auxiliary equipment 408. The comparison is used to perform at least one of treatment, continued monitoring, reporting, communication and modeling of the process gas compressor based on the comparisons. This may include performing at least one of treatment, continued monitoring, reporting, communication and modeling for the associated auxiliary equipment based on the comparisons. In some instances, the result of the comparison comprises injecting an additive into the processes gas compressor 400 based on the comparison. For example, the additive may be one or more of wash oil, boiler feed water, antipolymerant and surface modifier. In some instances, the device 406 may cause the additive to automatically be injected into the processes gas compressor 400. The device 406 may also automatically determine the type or types of additive to inject and/or the amount to inject.

In some instances, when the device 406 calculates the KPIs and diagnostic outputs for thermodynamic performance, rotor dynamics and system performance ratios associated with the process gas compressor 400, this may include thermodynamic trends and performance plots, mechanical and rotor dynamics trends for the process gas compressor and the auxiliary equipment.

In some instances, the process gas compressor 400 comprises a turbine section and a compressor section, and the mechanical and rotor dynamics calculated by the device 406 for the process gas compressor 400 include mechanical and rotor dynamics for each of the compressor section and the turbine section.

Advantageously, performing treatment based on the comparisons comprises providing versatile treatment recommendations specifically designed to meet a customer's reliability and performance expectations. It is also to be appreciated that in some instances a customer's available equipment measurement data source/historian can be used to define the KPIs for the thermodynamic performance, rotor dynamics and auxiliary equipment associated with the process gas compressor 400.

In some instances, performance reporting of the process gas compressor based on the comparisons comprises providing standardized service reports/monitoring/communication on a periodic basis. For example, the reports may be provided weekly or any other periodic basis. Performing communication of the process gas compressor based on the comparisons may comprise providing periodic service reports and coordinated periodic performance team discussion to ensure performance expectations are met. For example, the periodic service reports may be provided on a weekly basis and the coordinated periodic performance team discussions may occur on a quarterly basis. In some instances, performance modeling of the process gas compressor based on the comparisons comprises determining polytropic efficiency of the process gas compressor corrected for boiler feedwater injection, creating performance expectation models for feed slate changes and determining real-time compressibility factor (k-factor).

Figure 5:
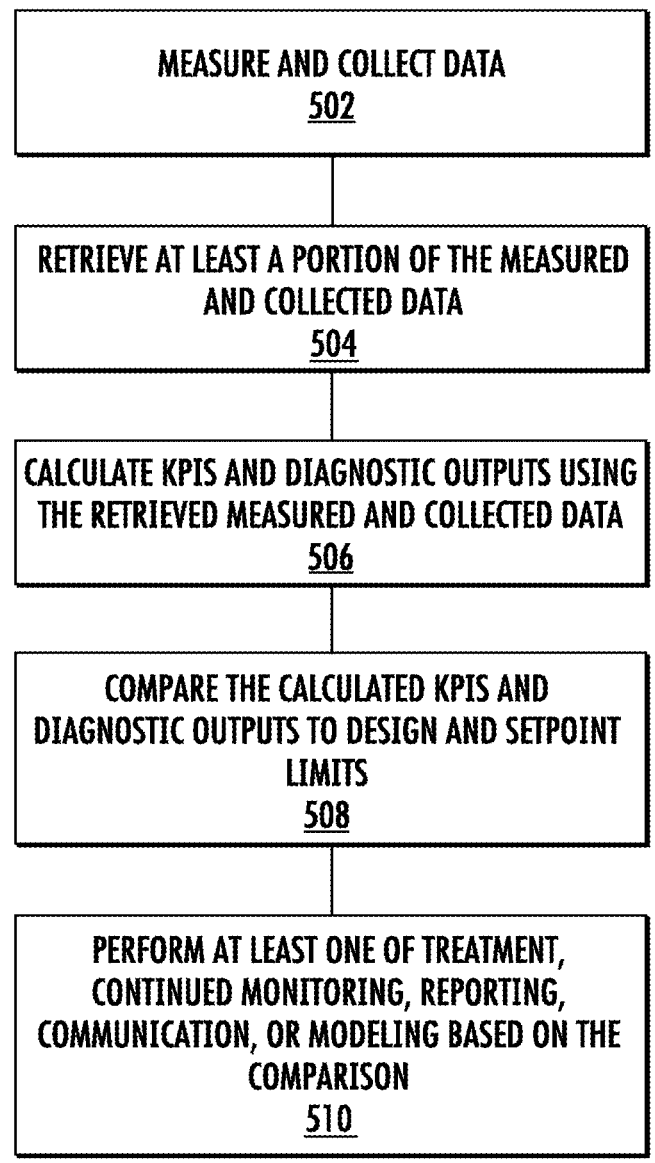
FIG. 5 is a flowchart for a method of monitoring and maintaining operation, performance and reliability of a process gas compressor and its auxiliary equipment used in a production environment, which can be implemented by the system of FIG. 4.

FIG. 5 is a flowchart that illustrates an exemplary method of monitoring and maintaining operation, performance and reliability of a process gas compressor and its auxiliary equipment used in a production environment. At step 502, data related to a process gas compressor 400 and its auxiliary equipment 408 is measured and collected. Generally, the data is measured and collected by a control/monitoring system 402. At least a portion of the measured and collected data is stored in a data historian 404. At 504, at least a portion of the measured and collected data stored in the data historian is retrieved. At 506, a processor is used to perform calculations for key performance indicators (KPIs) and diagnostic outputs for the process gas compressor and its auxiliary equipment using the retrieved measured and collected data. The KPIs and diagnostic outputs are defined for thermodynamic performance, rotor dynamics and system performance ratios associated with the process gas compressor and its associated auxiliary equipment (steam turbine, surface condenser, interstage coolers and condensation drums, and the like). At 508, the calculated KPIs and diagnostic outputs for the process gas compressor and its auxiliary equipment are compared to design and setpoint limits. And, at 510, at least one of treatment, continued monitoring, reporting, communication and modeling of the process gas compressor ad its auxiliary equipment are performed based on the comparisons. The described method may be implemented on a computing device comprising at least a processor and a memory in communication with the processor. For example, computing device 406. It is also to be appreciated that the method can be implemented using a computer program product comprised of a non-transitory computer readable medium with computer executable instructions stored thereon.

Figure 6:
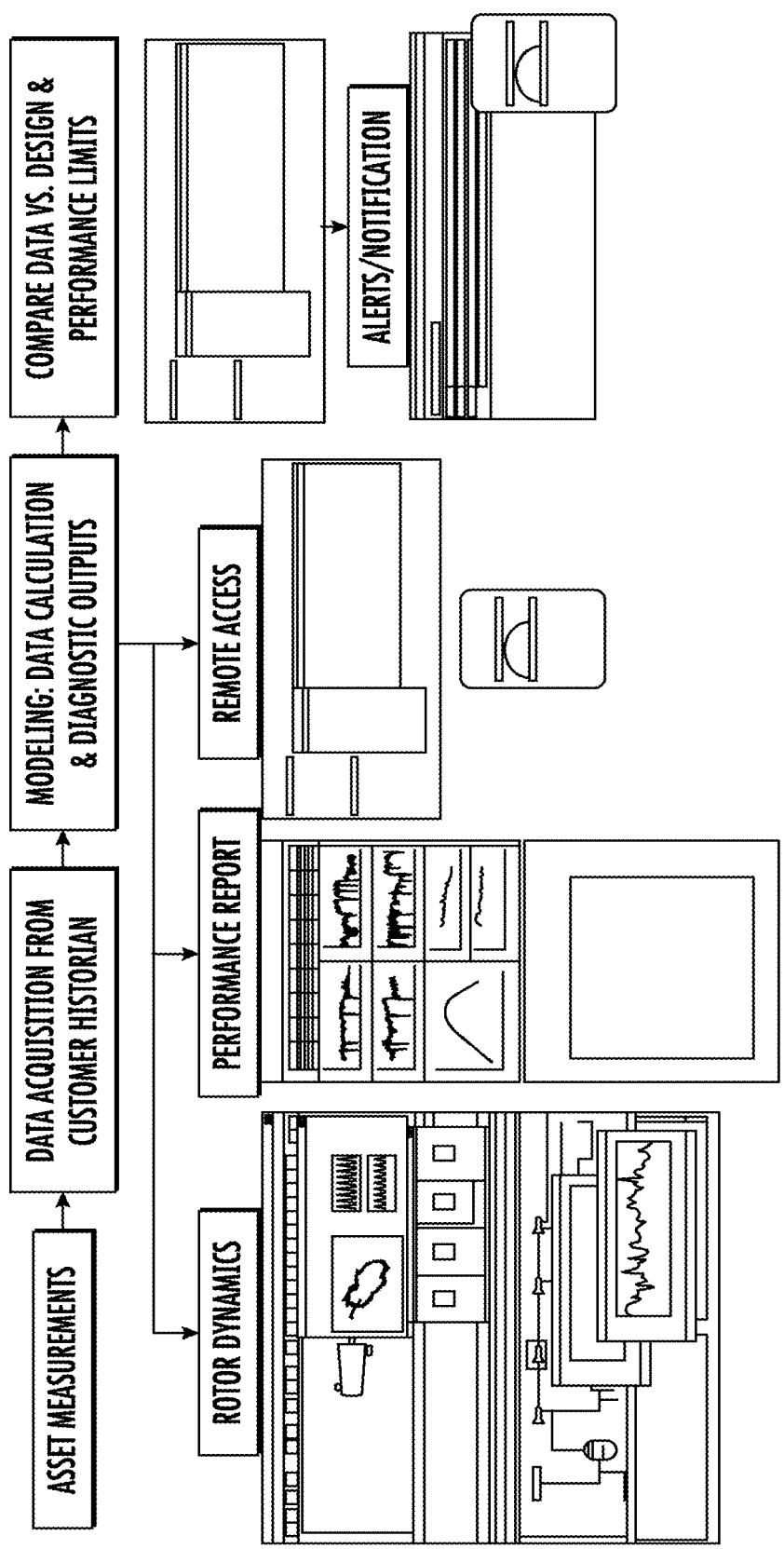
FIG. 6 is an illustration of the steps of the method of FIG. 5 and examples of outputs from that process.

FIG. 6 is an overview illustration that shows the steps of asset measurement, data acquisition, data modeling (calculation of KPIs and diagnostic outputs), and comparison of calculations versus design and performance limits for a process gas compressor. Exemplary outputs of rotor dynamics reports and performance reports are shown. Also illustrated are remote access capabilities and alerts/notifications that can be created by the system for monitoring and maintaining operation, performance and reliability of a process gas compressor used in a production environment.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise software for monitoring and maintaining operation, performance and reliability of a process gas compressor used in a production environment. In one exemplary aspect, the units can comprise a processing device that comprises a processor 721 as illustrated in FIG. 7 and described below.

Figure 7:
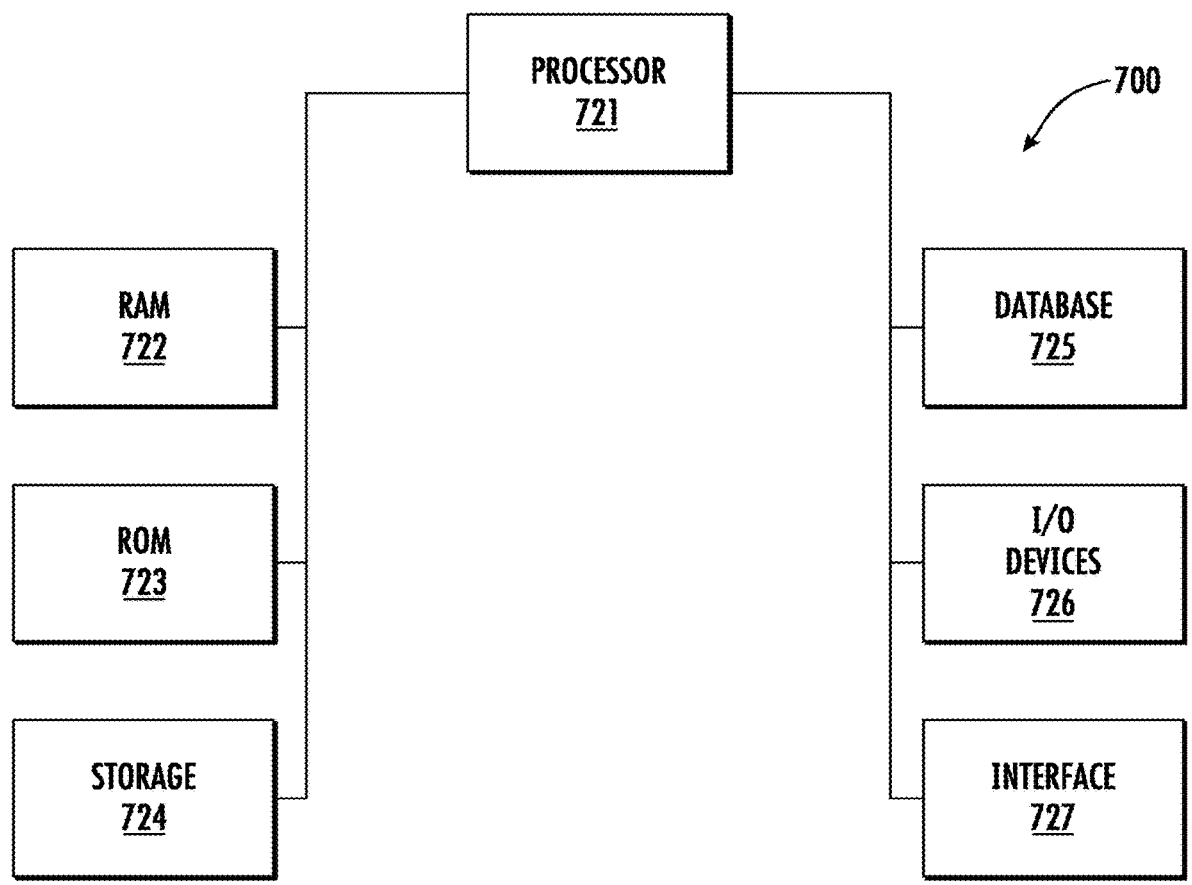
FIG. 7 is an exemplary computing device that can comprise all or a part of the control/monitoring system or can comprise a separate computing device used to implement aspects of the method of monitoring and maintaining operation, performance and reliability of a process gas compressor used in a production environment.

FIG. 7 is an exemplary computing device 700 that can comprise all or a part of the control/monitoring system or can comprise a separate computing device used to implement aspects of the method of monitoring and maintaining operation, performance and reliability of a process gas compressor used in a production environment. In various aspects, the processing device of FIG. 7 may comprise all or a portion of the device 406 and/or monitoring/control system 402. As used herein, "processing device" may include a plurality of processing devices. The processing device 710 may include one or more hardware components such as, for example, a processor 721, a random-access memory (RAM) module 722, a read-only memory (ROM) module 723, a storage 724, a database 725, one or more input/output (I/O) devices 726, and an interface 727. Alternatively, and/or additionally, the computing device 700 may include one or more software components such as, for example, a computer-readable medium including computer executable instructions for performing a method associated with the exemplary embodiments. It is contemplated that one or more of the hardware components listed above may be implemented using software. For example, storage 724 may include a software partition associated with one or more other hardware components. It is understood that the components listed above are exemplary only and not intended to be limiting.

Processor 721 may include one or more processors, each configured to execute instructions and process data to perform one or more functions associated with a processing device for monitoring and maintaining operation, performance and reliability of a process gas compressor used in a production environment. Processor 721 may be communicatively coupled to RAM 722, ROM 723, storage 724, database 725, I/O devices 726, and interface 727. Processor 721 may be configured to execute sequences of computer program instructions to perform various processes. The computer program instructions may be loaded into RAM 722 for execution by processor 721.

RAM 722 and ROM 723 may each include one or more devices for storing information associated with operation of processor 721. For example, ROM 723 may include a memory device configured to access and store information associated with computing device 700, including information for identifying, initializing, and monitoring the operation of one or more components and subsystems. RAM 722 may include a memory device for storing data associated with one or more operations of processor 721. For example, ROM 723 may load instructions into RAM 722 for execution by processor 721.

Storage 724 may include any type of mass storage device configured to store information that processor 721 may need to perform processes consistent with the disclosed embodiments. For example, storage 724 may include one or more magnetic and/or optical disk devices, such as hard drives, CD-ROMs, DVD-ROMs, or any other type of mass media device.

Database 725 may include one or more software and/or hardware components that cooperate to store, organize, sort, filter, and/or arrange data used by computing device 700 and/or processor 721. For example, database 725 may store an algorithm for monitoring and maintaining operation, performance and reliability of a process gas compressor used in a production environment. Database 725 may also store information associated with a method of monitoring and maintaining operation, performance and reliability of a process gas compressor used in a production environment, comprising retrieving at least a portion of measured and collected data associated with a process gas compressor; performing calculations for key performance indicators (KPIs) and diagnostic outputs for the process gas compressor using the retrieved measured and collected data; comparing the calculated KPIs and diagnostic outputs for the process gas compressor to design and setpoint limits; and performing at least one of treatment, continued monitoring, reporting, communication and modeling of the process gas compressor based on the comparisons. It is contemplated that database 725 may store additional and/or different information than that listed above.

I/O devices 726 may include one or more components configured to communicate information with a user associated with computing device 700. For example, I/O devices may include a console with an integrated keyboard and mouse to allow a user to maintain an algorithm for monitoring and maintaining operation, performance and reliability of a process gas compressor used in a production environment, and the like. I/O devices 726 may also include a display including a graphical user interface (GUI) for outputting information on a monitor. I/O devices 726 may also include peripheral devices such as, for example, a printer for printing information associated with computing device 700, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 727 may include one or more components configured to transmit and receive data via a communication network, such as the Internet, a local area network, a workstation peer-to-peer network, a direct link network, a wireless network, or any other suitable communication platform. For example, interface 727 may include one or more modulators, demodulators, multiplexers, demultiplexers, network communication devices, wireless devices, antennas, modems, and any other type of device configured to enable data communication via a communication network.

Figure 8B:
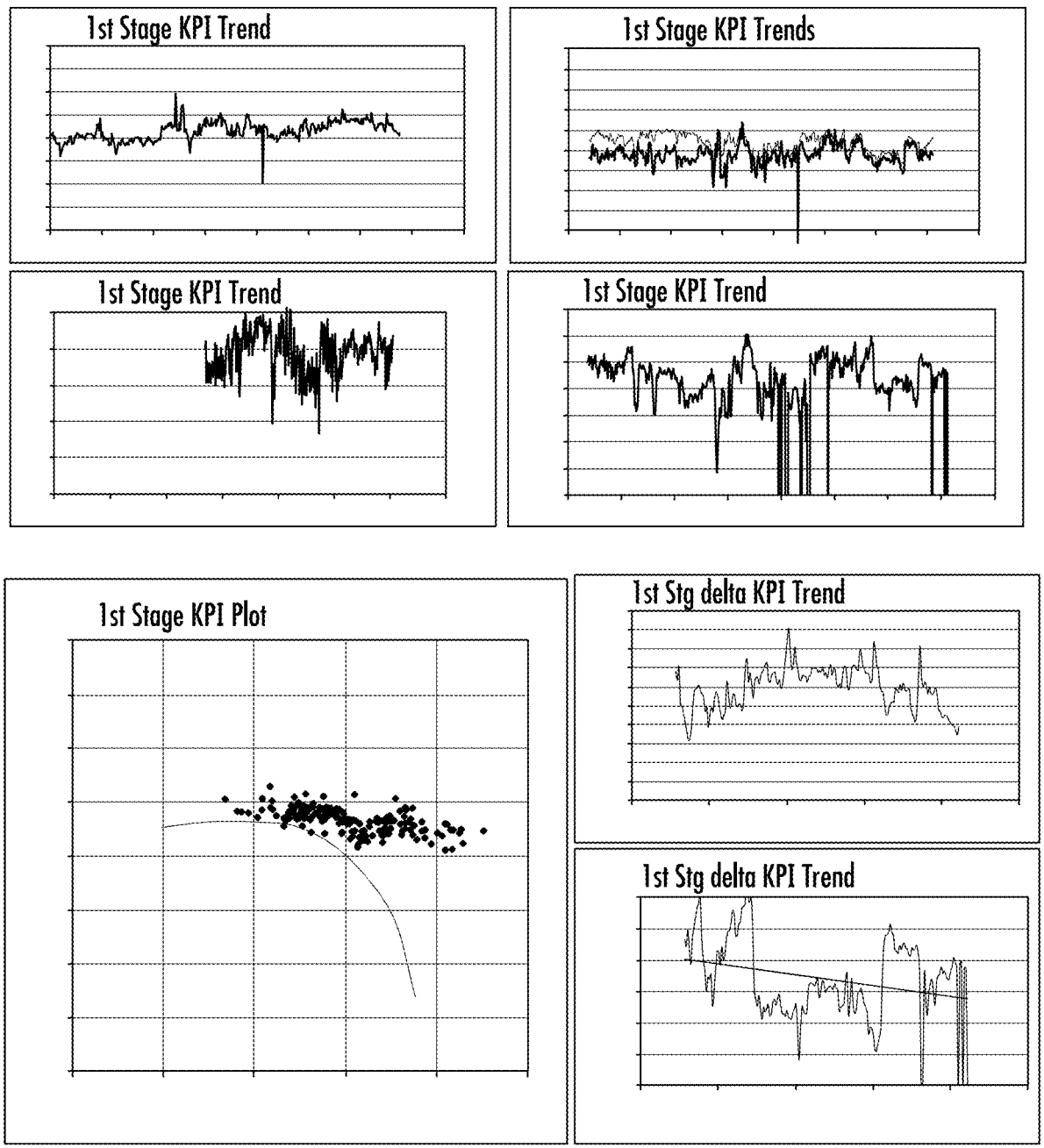
FIGS. 8A-8Q are example outputs and reports from the method described in FIG. 5.
Figure 8C:
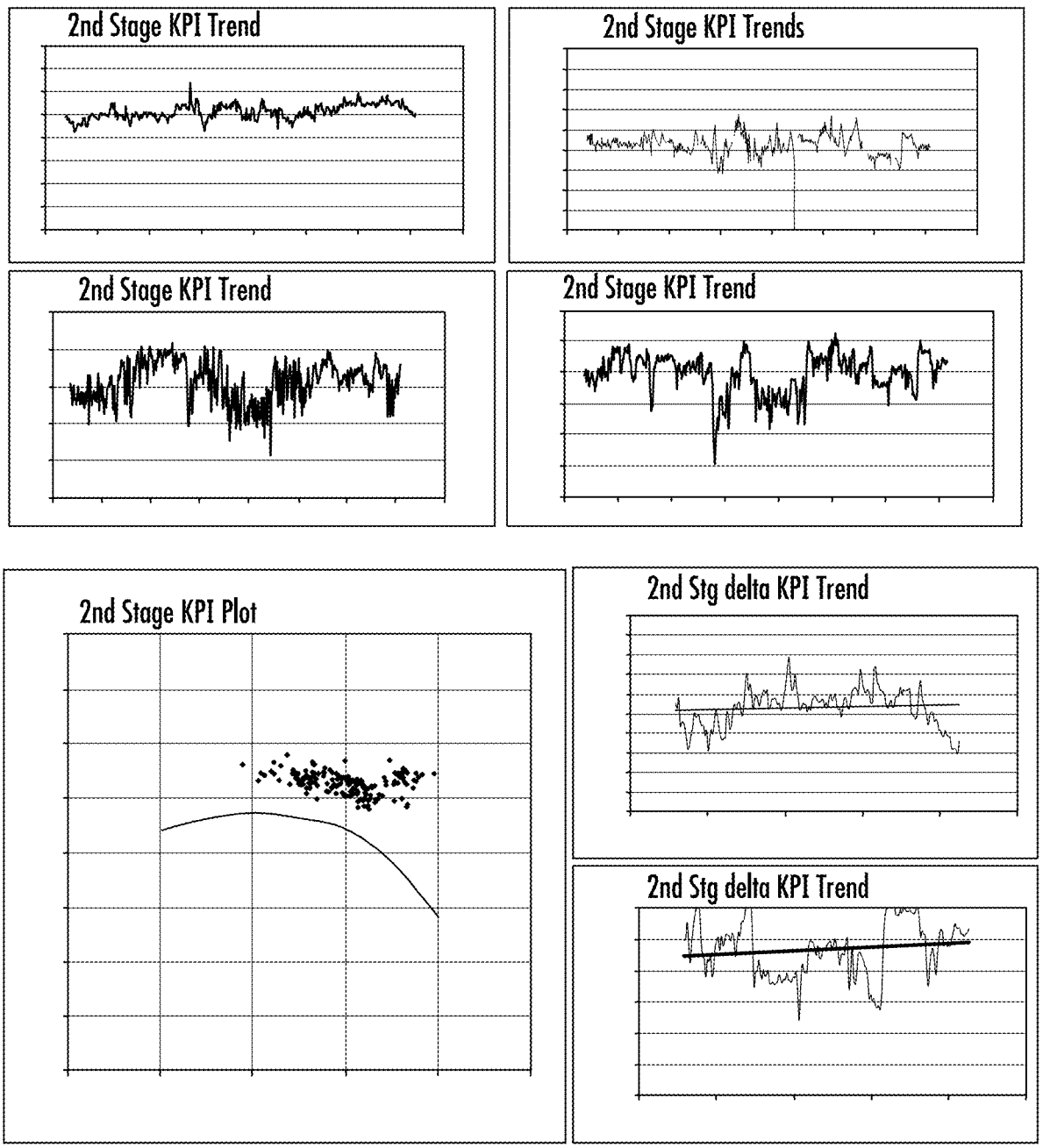
Figure 8D:
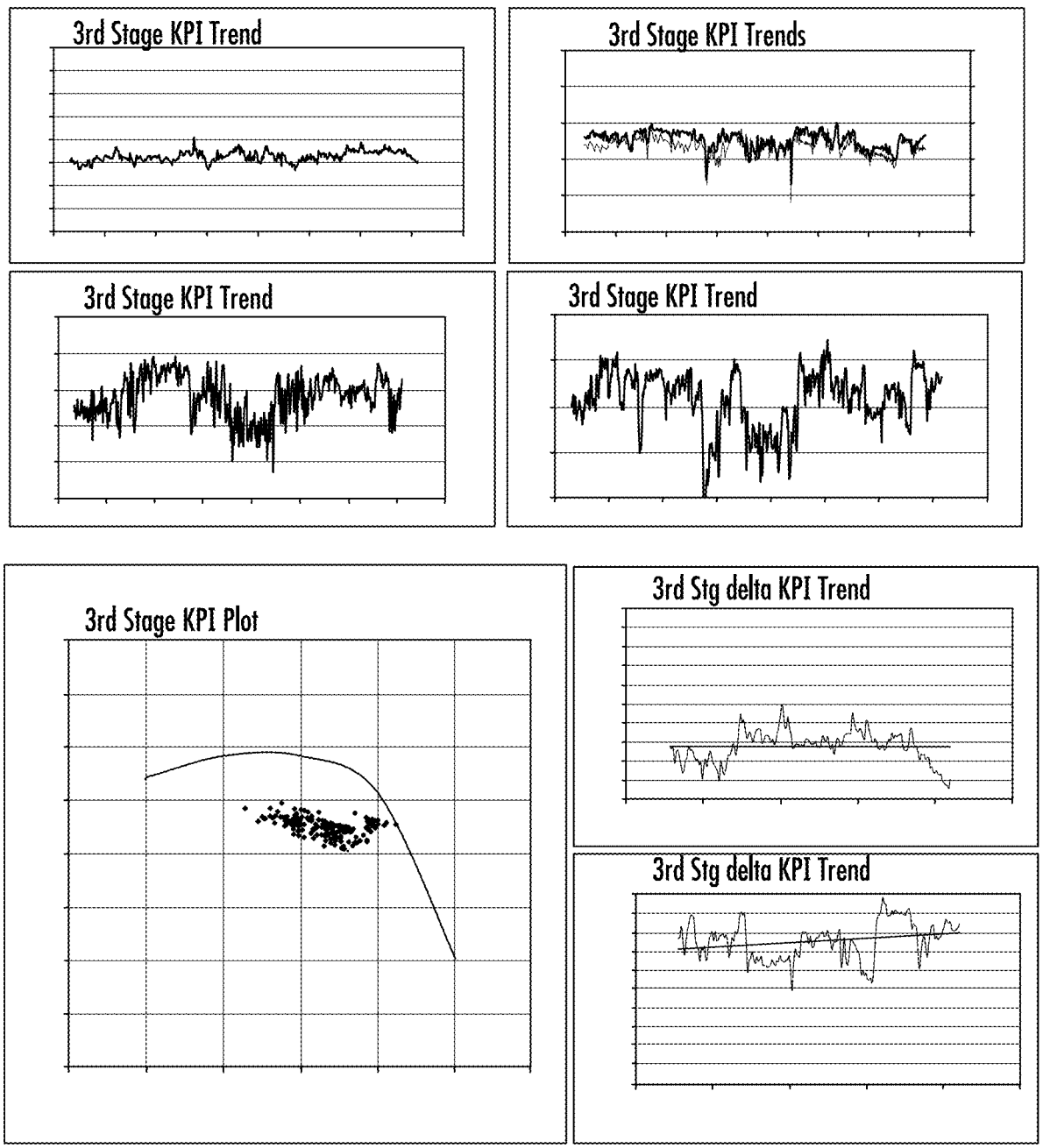
Figure 8E:
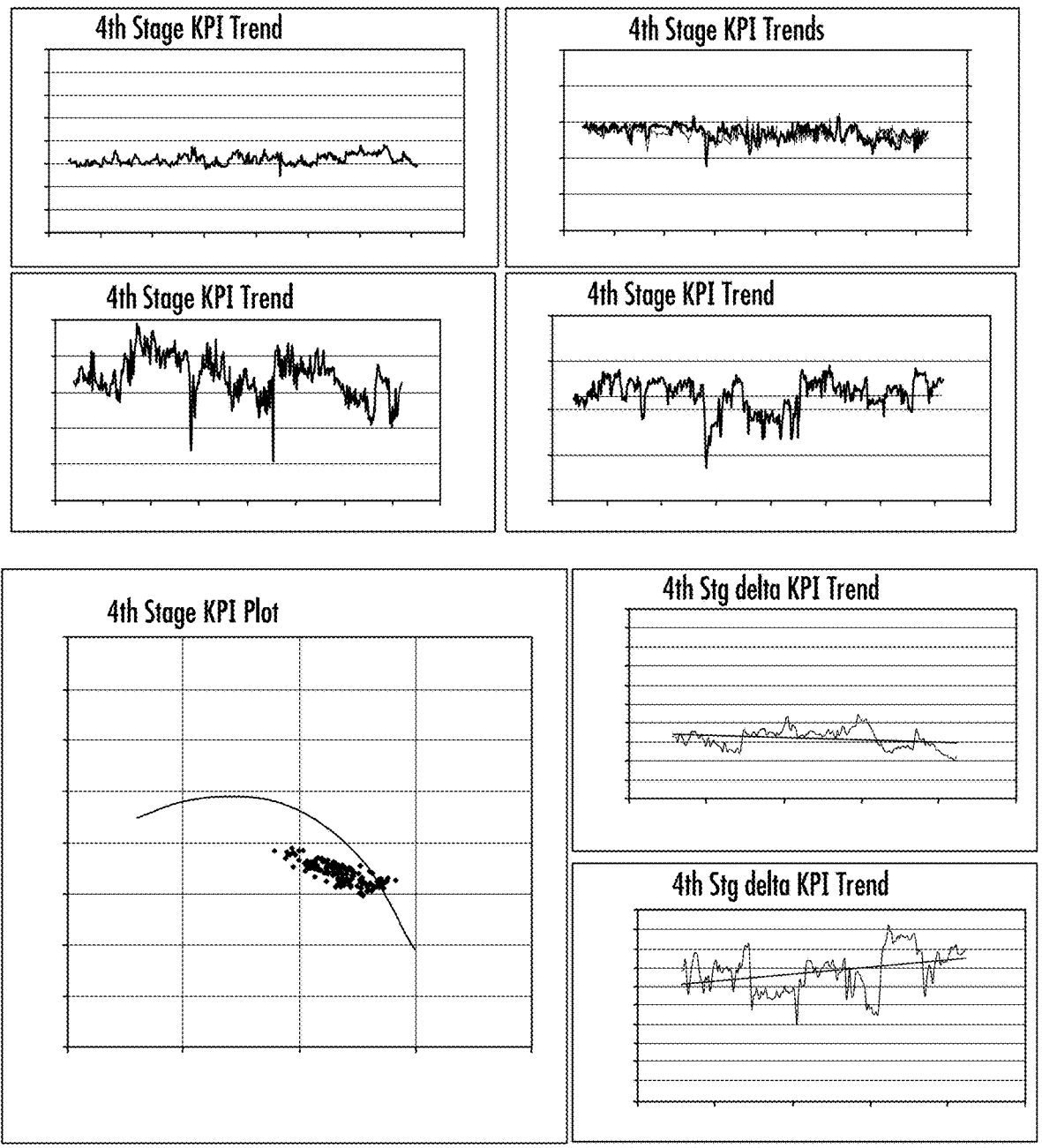
Figure 8F:
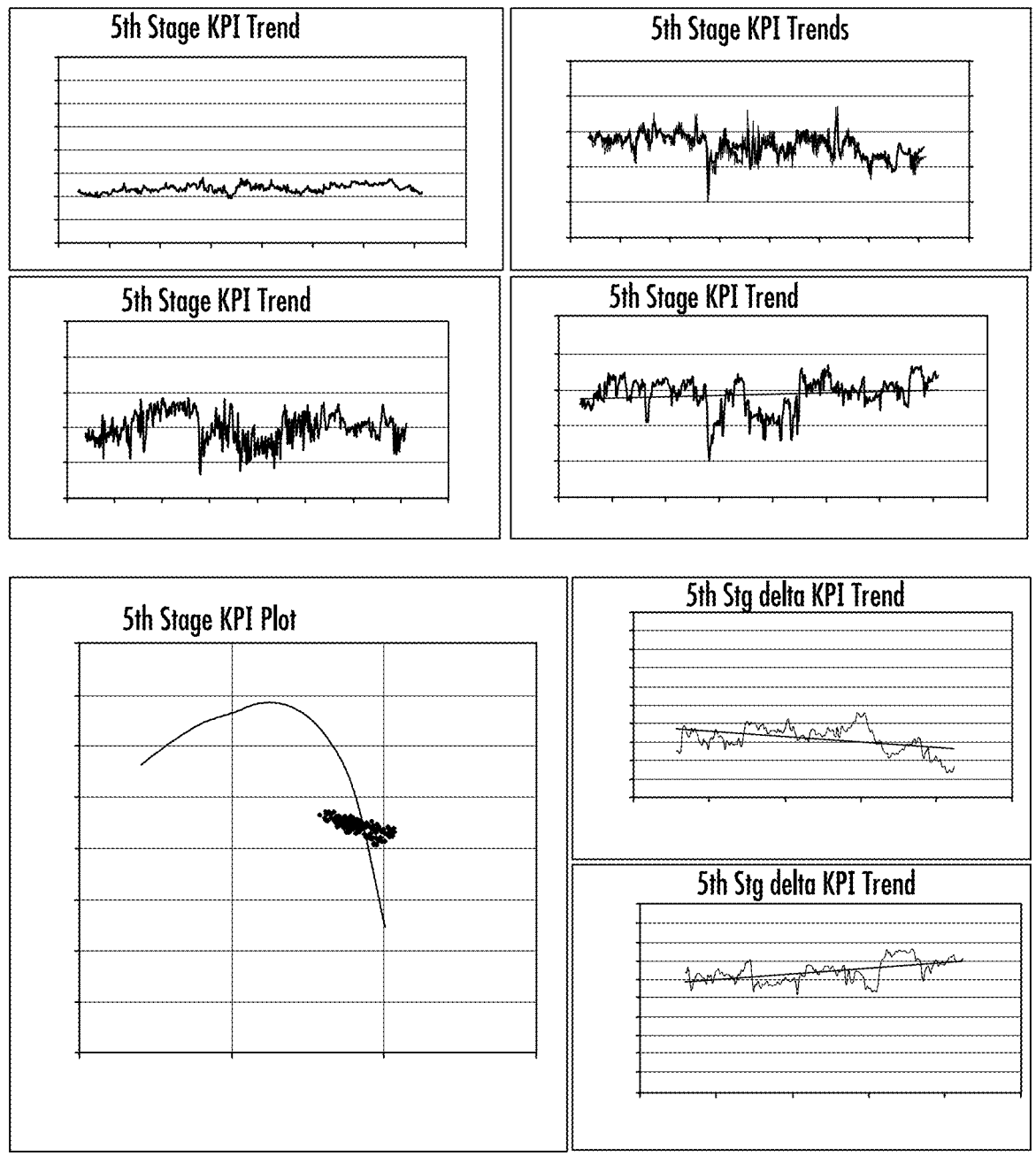
Figure 8G:
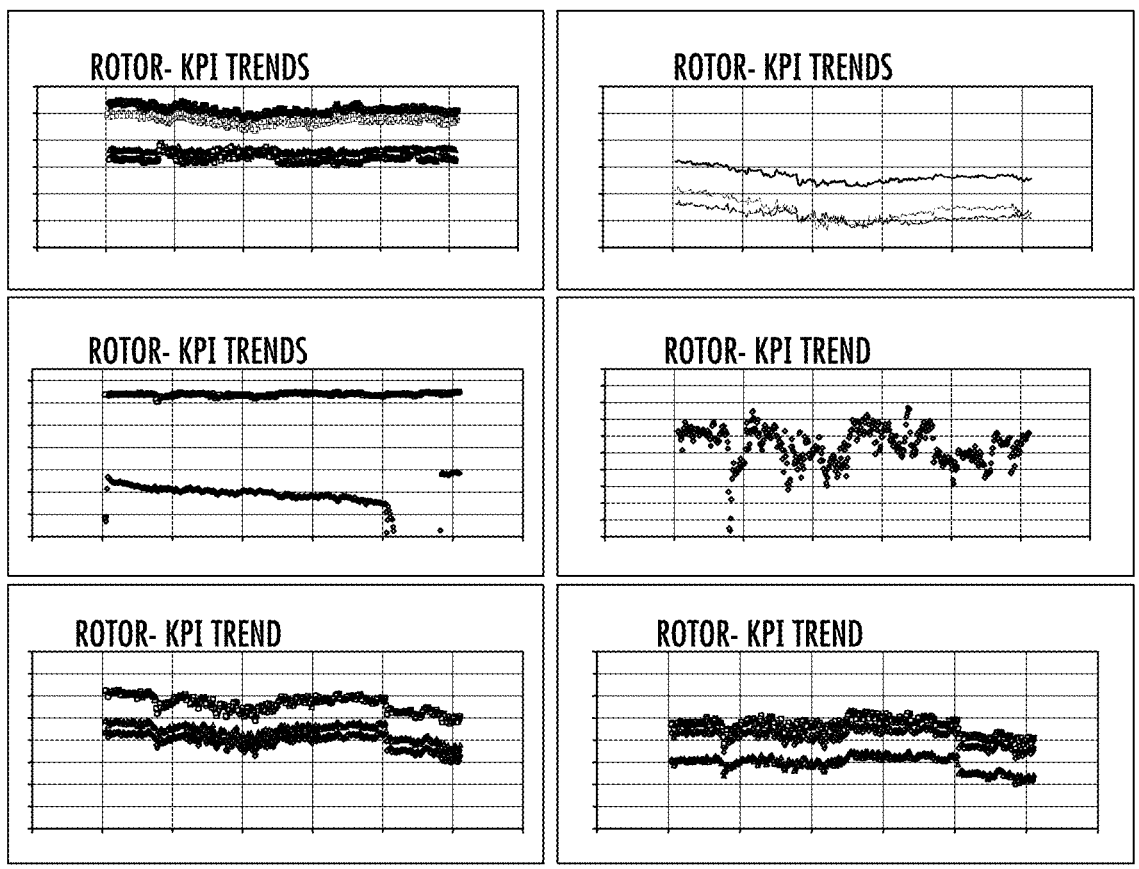
Figure 8H:
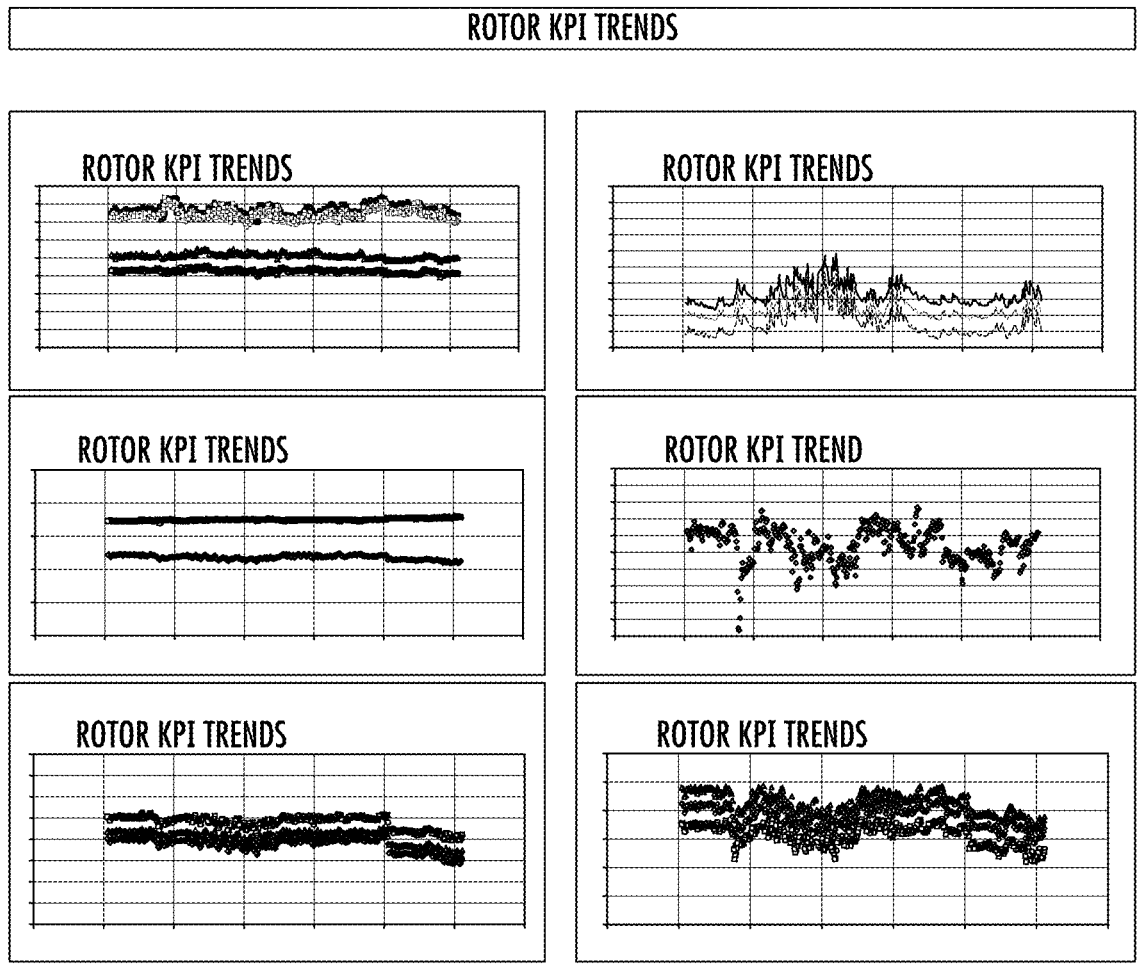
Figure 8I:
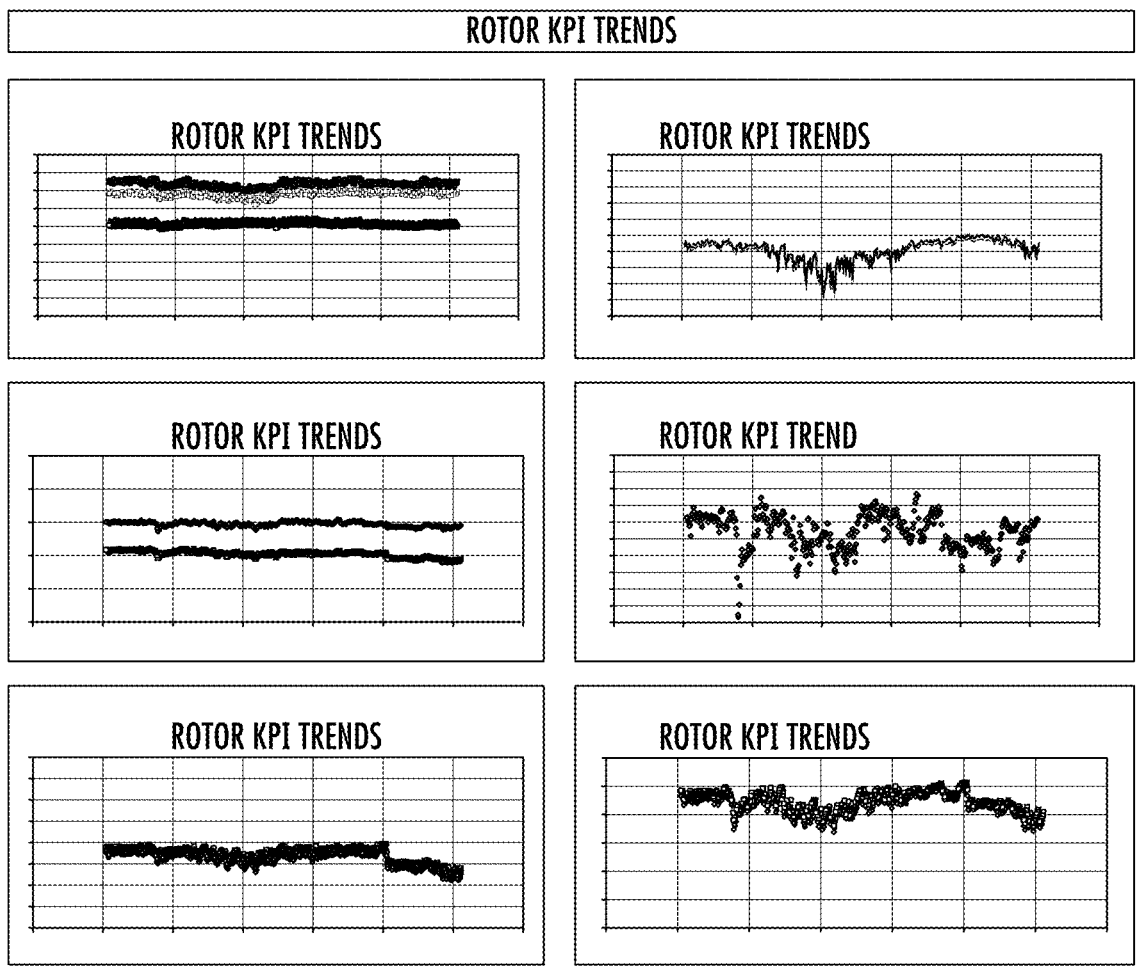
Figure 8J:
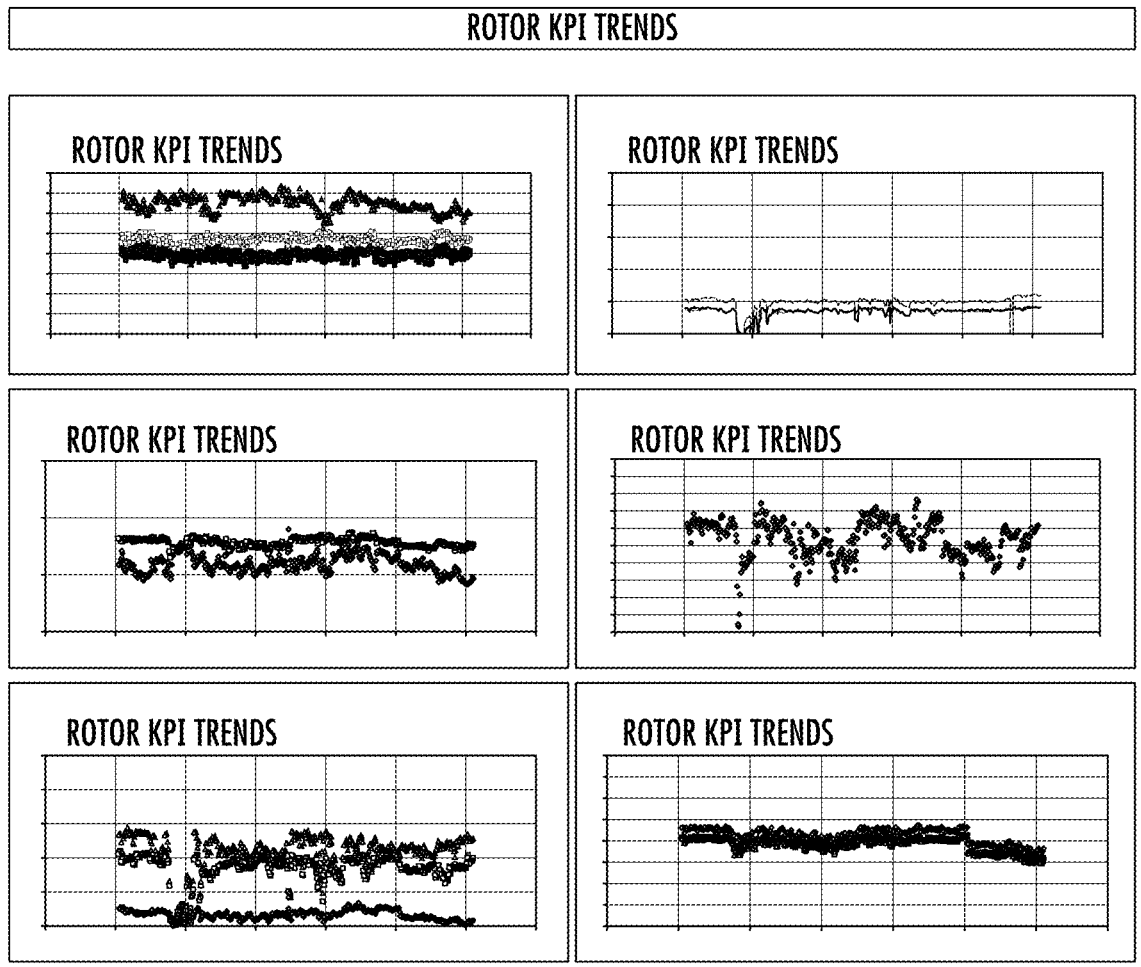
Figure 8K:
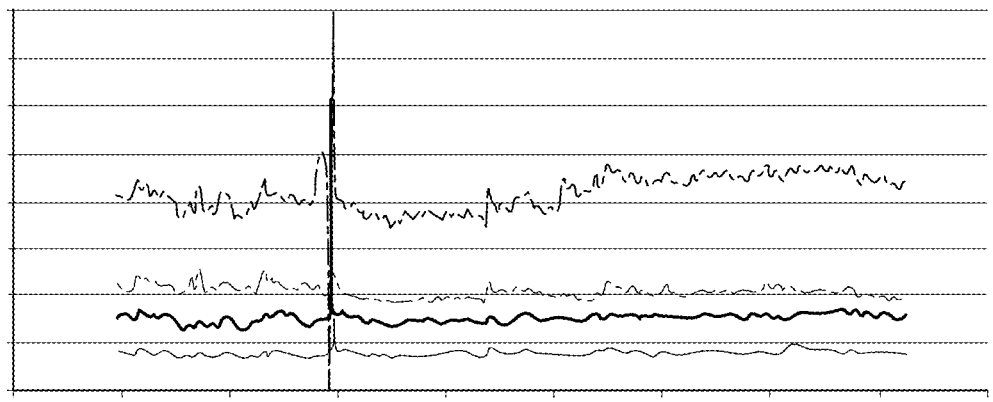
Figure 8K:
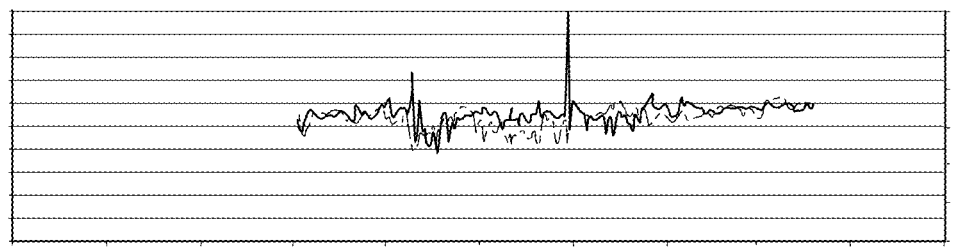
Figure 8K:
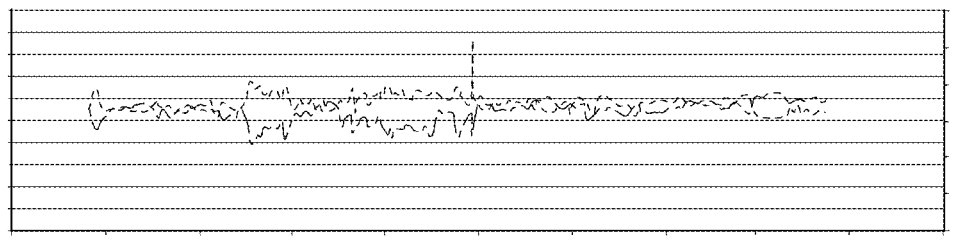
Figure 8L:
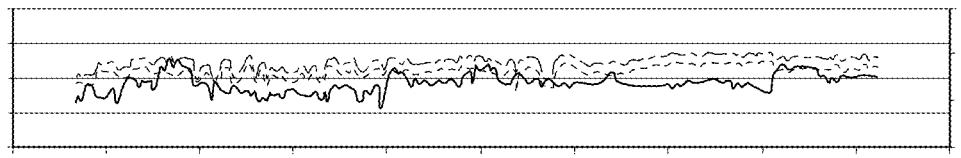
Figure 8L:
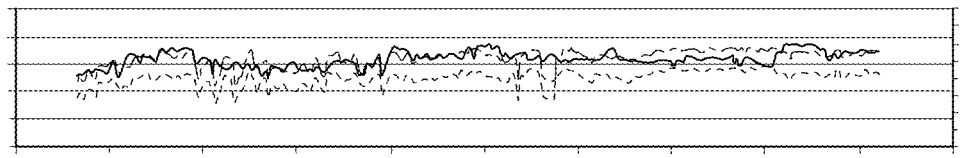
Figure 8L:
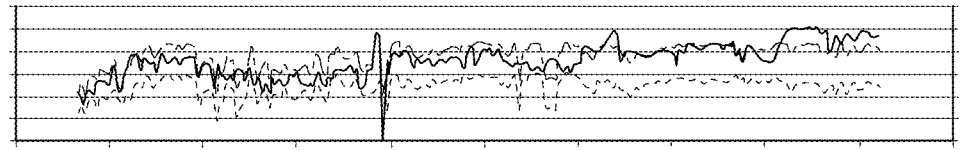
Figure 8L:
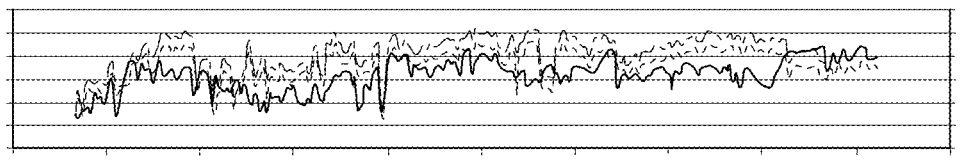
Figure 8M:
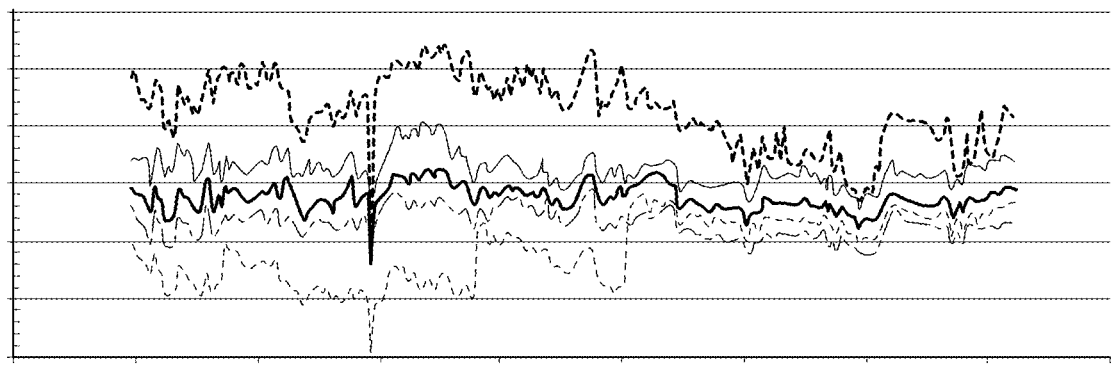
Figure 8M:
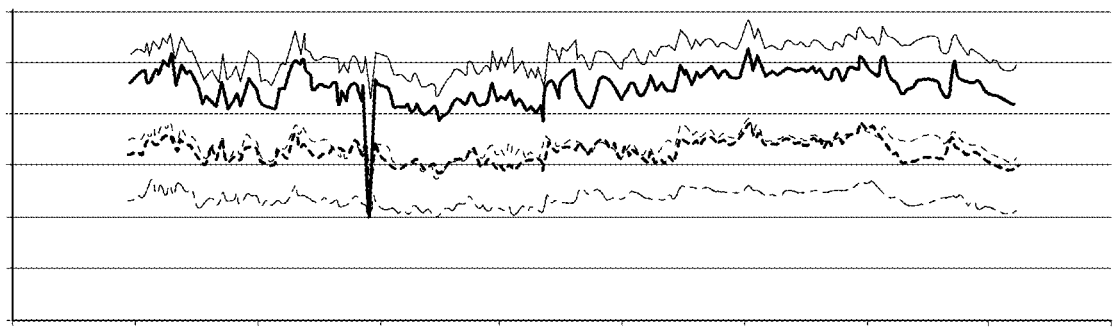
Figure 8N:
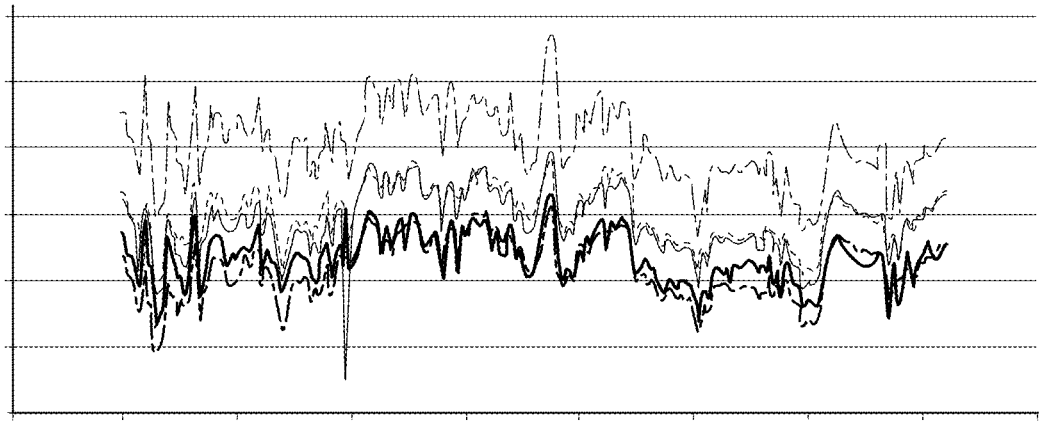
Figure 8N:
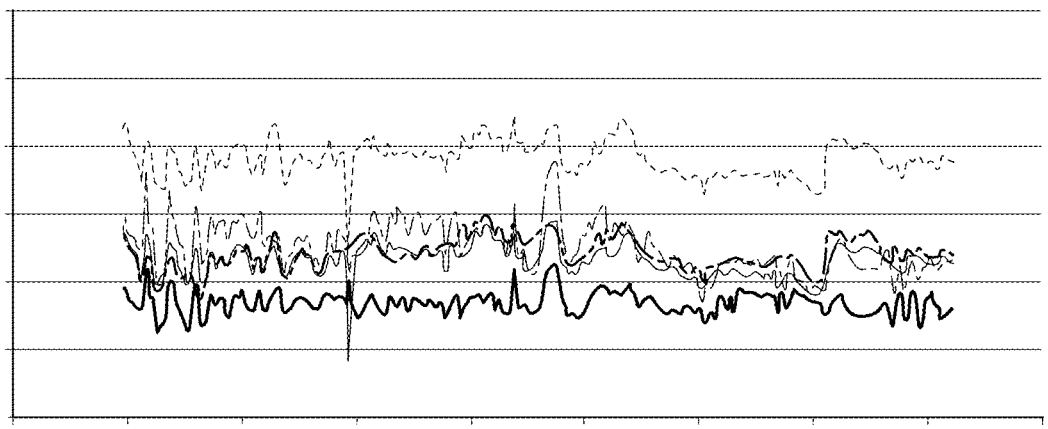
Figure 8O:
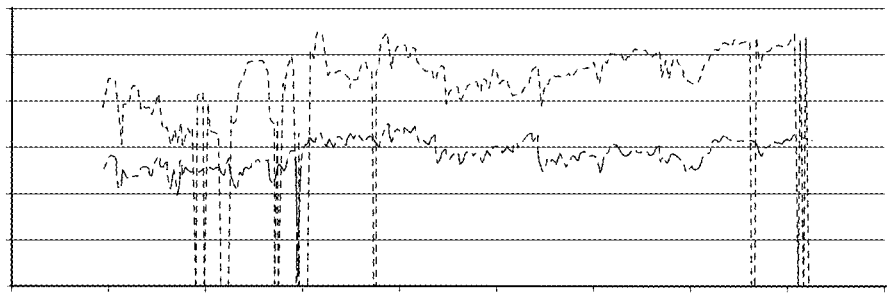
Figure 8O:
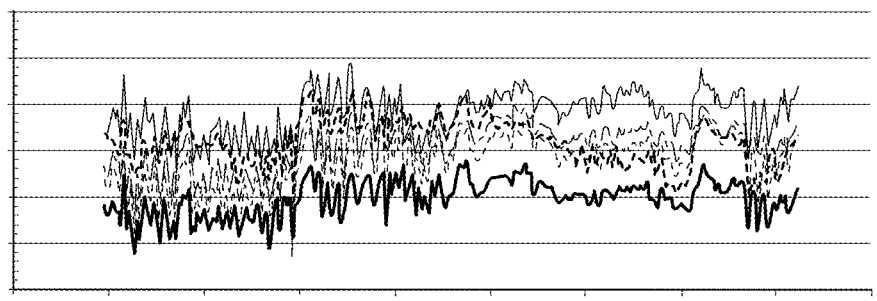
Figure 8P:
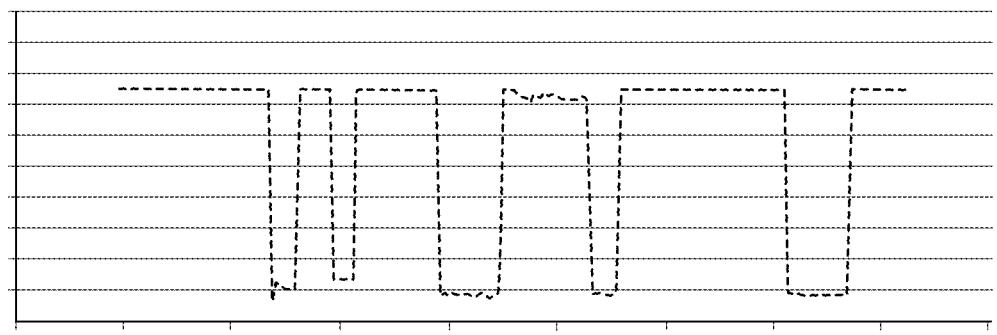
Figure 8P:
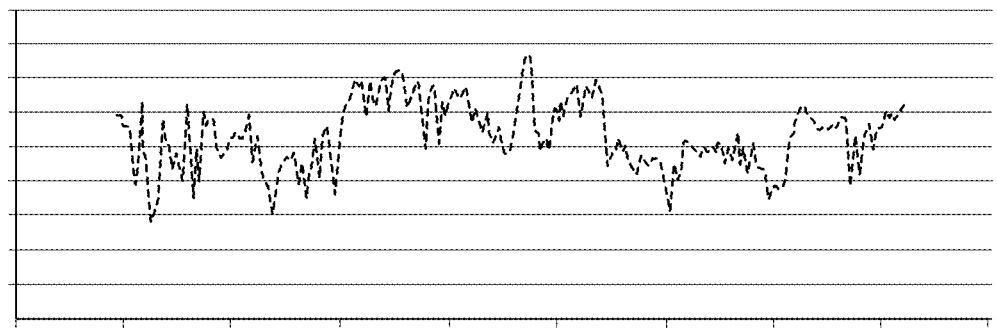
Figure 8Q:
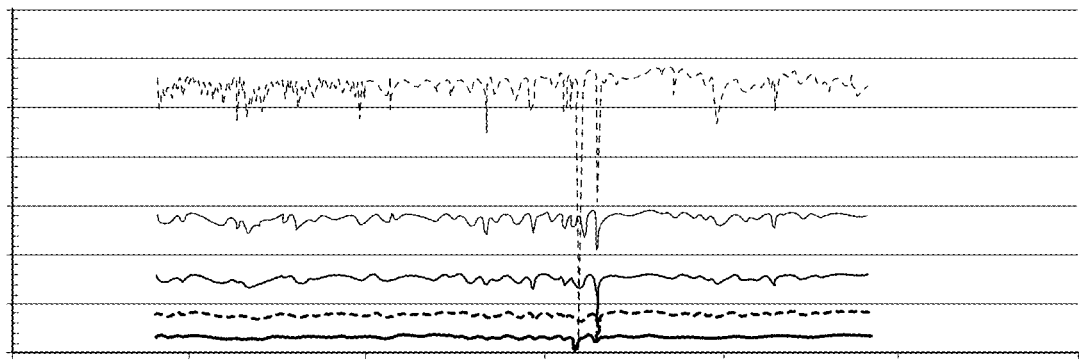
Figure 8Q:
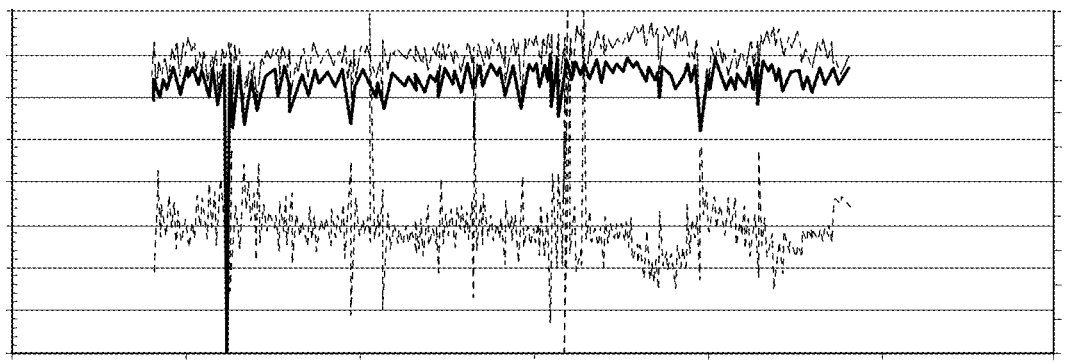

As noted above, the device 406 is used to create standardized service reports/monitoring/communication on a periodic basis. FIGS. 8A-8Q are examples of such reports. The report illustrated in FIGS. 8A-8Q help to simplify and standardize the vast sea of raw data from the process gas compressor and its associated auxiliary equipment (steam turbine, surface condenser, interstage coolers and condensation drums, and the like). The raw data is translated into numerical key performance indicators (KPIs) which can be graphically trended as health insights and performance relevant information trends. The report helps to distinguish between an anticipated performance pattern and an uncharacteristic condition. In some instances, uncharacteristic conditions noted in the report are reviewed and communicated by qualified engineering experts. In summary, the generated report, reviewed by a qualified expert, can systematically analyze the health of the process gas compressor and its auxiliary equipment, reducing unplanned downtime while improving asset productivity and performance.

It is to be appreciated that while the above methods, systems and computer program products generally focus on the production of ethylene, these methods, systems and computer program products can also be applied and utilized in other production environments including oil and gas production and processing; oil refining; industrial gas production; and the like.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of monitoring and maintaining operation, performance and reliability of a process gas compressor and its associated auxiliary equipment used in a production environment, said method comprising:
   measure and collect data related to a process gas compressor and its associated auxiliary equipment;
   store at least a portion of the measured and collected data in a data historian;
   retrieve at least a portion of the measured and collected data stored in the data historian;
   perform calculations for key performance indicators (KPIs) and diagnostic outputs for the process gas compressor and its associated auxiliary equipment using the retrieved measured and collected data, wherein the KPIs and diagnostic outputs are calculated for thermodynamic performance, rotor dynamics, and system performance ratios associated with the process gas compressor and its associated auxiliary equipment;
   compare the calculated KPIs and diagnostic outputs for the process gas compressor and its associated auxiliary equipment to design and setpoint limits; and
   perform at least one of treatment, continued monitoring, reporting, communication and modeling of the process gas compressor and its associated auxiliary equipment based on the comparisons.

2. The method of claim 1, further comprising injecting an additive into the processes gas compressor and its associated auxiliary equipment based on the comparison.

3. The method of claim 2, wherein the additive comprises one or more of wash oil, boiler feed water, antipolymerant and surface modifier.

4. The method of claim 1, wherein the method of monitoring and maintaining operation, performance and reliability of the process gas compressor includes monitoring and maintaining operation, performance and reliability of the associated auxiliary equipment.

5. The method of claim 4, wherein measuring and collecting data related to the process gas compressor includes measuring and collecting data related to the auxiliary equipment associated with the process gas compressor.

6. The method of claim 5, wherein performing calculations for key performance indicators (KPIs) and diagnostic outputs for the process gas compressor includes performing calculations for key performance indicators (KPIs) and diagnostic outputs for the associated auxiliary equipment using the retrieved measured and collected data.

7. The method of claim 6, wherein comparing the calculated KPIs and diagnostic outputs for the process gas compressor to design and setpoint limits includes comparing the calculated KPIs and diagnostic outputs for the associated auxiliary equipment.

8. The method of claim 7, wherein performing at least one of treatment, continued monitoring, reporting, communication and modeling based on the comparisons includes performing at least one of treatment, continued monitoring, reporting, communication and modeling for the associated auxiliary equipment based on the comparisons.

9. The method of claim 1, wherein the KPIs and diagnostic outputs that are calculated for thermodynamic performance, rotor dynamics and system performance ratios associated with the process gas compressor include thermodynamic trends and performance plots, mechanical and rotor dynamics for the process gas compressor, and auxiliary equipment performance.

10. The method of claim 9, wherein the process gas compressor comprises a turbine section and a compressor section, and the mechanical and rotor dynamics for the process gas compressor include mechanical and rotor dynamics for each of the compressor section and the turbine section.

11. The method of claim 9, wherein the KPIs and diagnostic outputs associated with the auxiliary equipment include one or more of pressure differential across piping, status and performance of interstage coolers, status and performance of exchangers and knock-out drums, key performance ratios, approach temperatures, and horsepower trends.

12. The method of claim 1, wherein one of the KPIs comprise polytropic efficiency of the process gas compressor.

13. The method of claim 1, wherein measuring and collecting data related to the process gas compressor comprises measuring and collecting system vibration information and rotor thrust bearing information.

14. The method of claim 1, wherein performing treatment based on the comparisons comprises providing versatile treatment recommendations specifically designed to meet a customer's reliability and performance expectations.

15. The method of claim 1, wherein performing continued monitoring comprises utilizing a customer's available equipment measurement data source/historian to define the KPIs for the thermodynamic performance, rotor dynamics and system performance ratios associated with the process gas compressor.

16. The method of claim 1, wherein performing reporting of the process gas compressor based on the comparisons comprises providing standardized service reports/monitoring/communication on a periodic basis.

17. The method of claim 1, wherein performing communication of the process gas compressor based on the comparisons comprises providing periodic service reports and coordinated periodic performance team discussion to ensure performance expectations are met.

18. The method of claim 1, wherein performing modeling of the process gas compressor based on the comparisons comprises determining polytropic efficiency of the process gas compressor corrected for boiler feedwater injection, creating performance expectation models for feed slate changes and determining real-time compressibility factor (k-factor).

19. The method of claim 1, wherein the process gas compressor has from three to five separate stages.

20. The method of claim 1, wherein the auxiliary equipment associated with the process gas compressor comprise one or more of a steam turbine, a surface condenser, and interstage coolers and condensation drums.

21. The method of claim 1, wherein the production environment comprises one of ethylene production, oil and gas production and processing, oil refining, or industrial gas production.

* * * * *